UNITED STATES PATENT OFFICE.

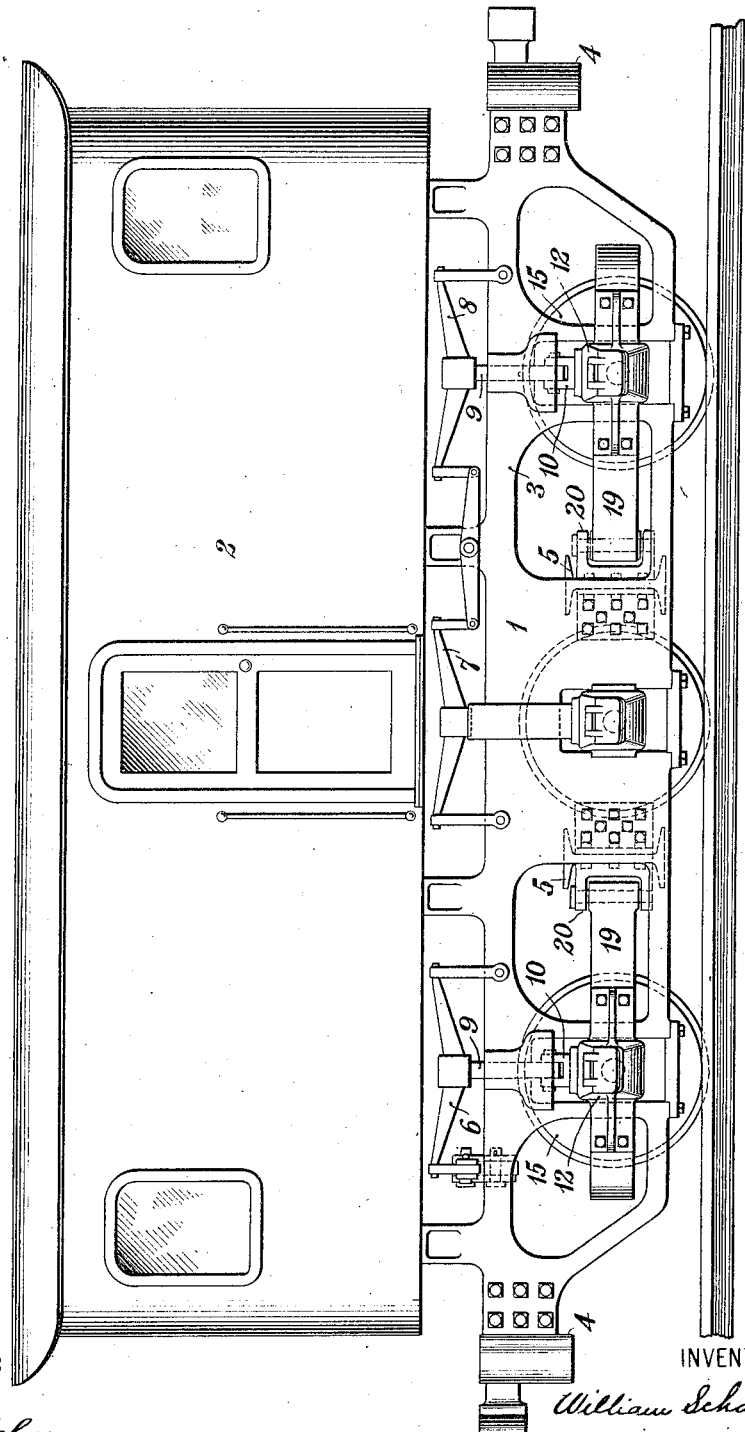

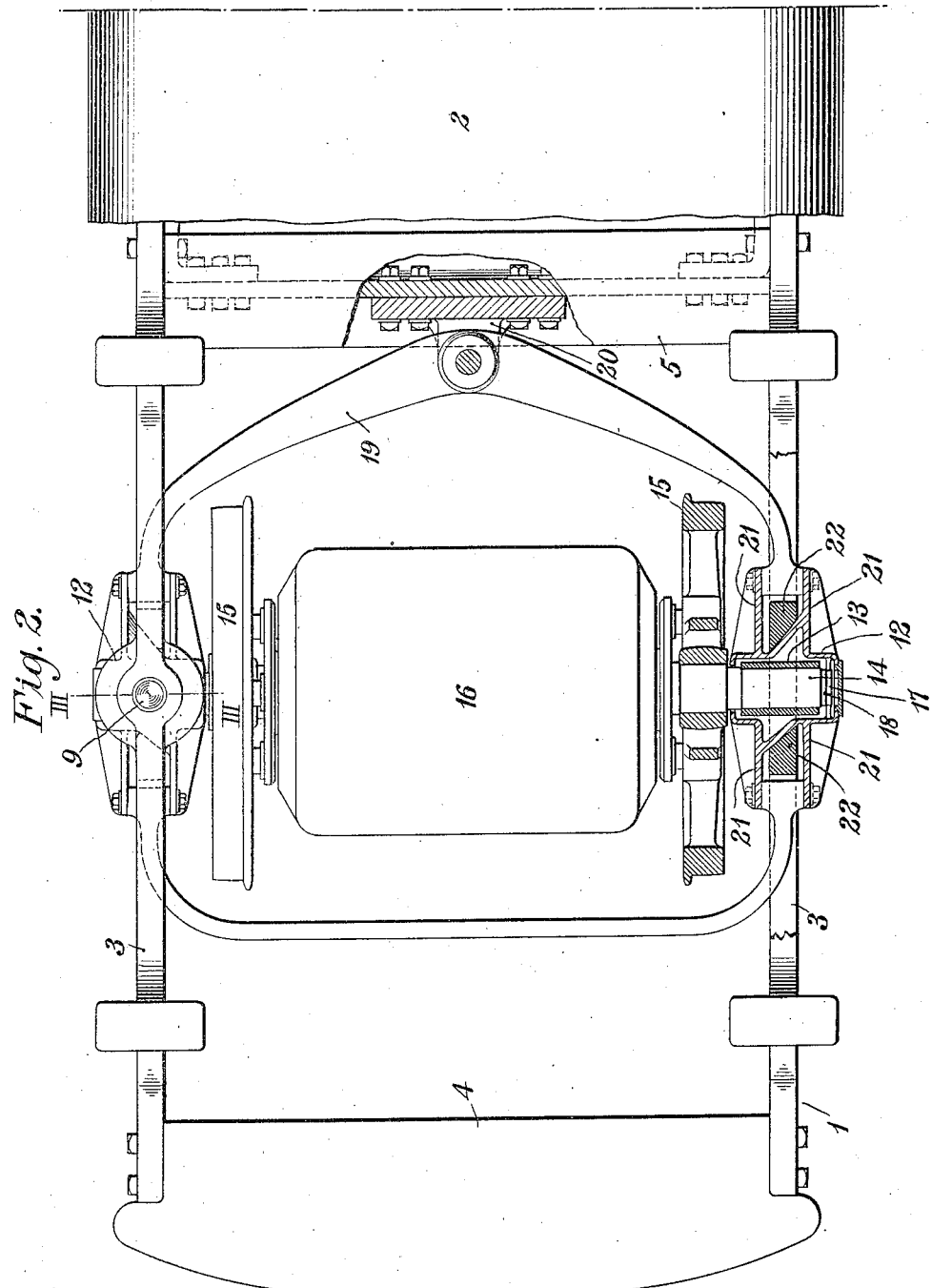

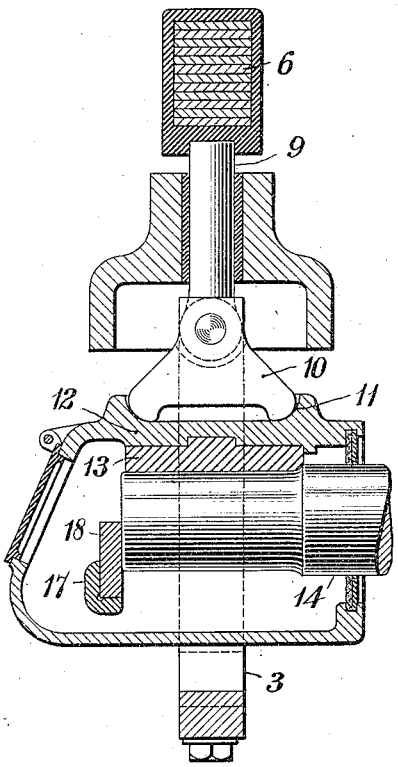

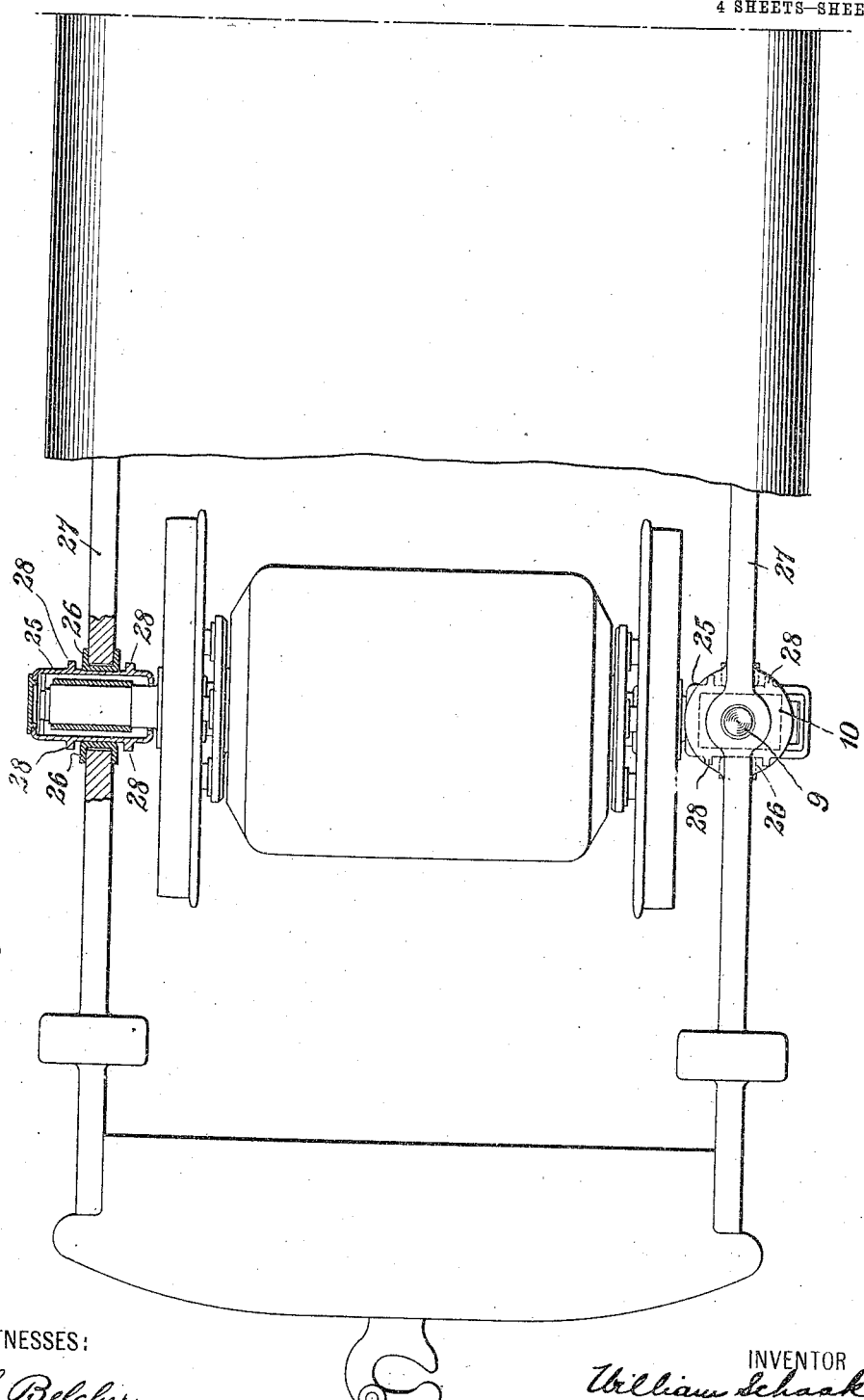

WILLIAM SCHAAKE, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

ELECTRIC LOCOMOTIVE.

981,799.  Specification of Letters Patent.  Patented Jan. 17, 1911.

Application filed February 24, 1908. Serial No. 417,507.

*To all whom it may concern:*

Be it known that I, WILLIAM SCHAAKE, a citizen of the United States, and a resident of Pittsburg, in the county of Allegheny and State of Pennsylvania, have invented a new and useful Improvement in Electric Locomotives, of which the following is a specification.

My invention relates to vehicle trucks, and it has for its object to so construct and arrange the parts of a truck that the wheel base of the vehicle may be of any desired and reasonable length, without interfering with movement thereof upon curves in the track.

Figure 1 of the accompanying drawings is a view, in side elevation, of a locomotive having a truck constructed in accordance with my invention. Fig. 2 is a top plan view of a portion of the vehicle truck of Fig. 1, some of the parts being broken away and others being shown in section for the sake of clearness of illustration. Fig. 3 is a vertical sectional view, on the line III—III of Fig. 2, and Fig. 4 is a view, similar to Fig. 2 but showing a modified structure.

The vehicle truck comprises a main frame 1 that supports a cab or car body 2, the said frame comprising cast or forged side trusses or members 3, end members 4 and I-beam cross members 5. The frame 1 is resiliently supported by means of springs 6, 7 and 8, the springs 6 and 8 being secured to the upper ends of posts 9 that project through openings in the side members of the frame and are capable of reciprocating motion with respect to the frame. The posts 9 are pivoted at their lower ends to feet 10 for which seats 11 are provided upon the upper sides of housings 12 for journal bearings 13 upon the ends of axles 14 that carry driving wheels 15 for the vehicle and are surrounded by propelling motors 16. Upon the interiors of the bearing housings 12 are cross-webs 17 that support bearing plates 18 against the ends of the driving axles, so that movements of the driving axles longitudinally of their axes will also effect movement of the bearings 13 and the housings 12. The axles are also provided with shoulders that engage the inner ends of the bearings 13 and assist in transmitting longitudinal movements of the axles to the bearing housings. The housings 12 are secured to auxiliary frames 19 the inner ends of which are pivoted to brackets 20 that are attached to the I-beam cross members 5 of the main frame of the truck. The housings 12 are provided, upon each side, with spaced wings or plates 21 between which are disposed vertical guide bars 22 that constitute parts of the main frame of the truck. The opposing faces of the adjacent guide bars, as well as the corresponding faces of the bearing housings with which they are adapted to engage, are inclined at angles to the axes of the driving axles, or are otherwise suitably shaped to permit, not only of relative vertical reciprocating motion between the housing and the main frame, but also of relative oscillation between the main and auxiliary frames of the truck about their pivotal connection and within the limits of the clearances between the guide bars 22 and the wings 21 upon the bearing housings.

When the vehicle is traveling upon a straight track, the feet 10 either rest squarely upon the seats 11 provided therefor upon the bearing housings or rock slightly because of irregularities in the track. When the vehicle operates upon a curved portion of the track, however, the auxiliary frames 19 and the parts carried thereby are caused to oscillate with respect to the main frame of the truck, with the result that the feet 10 are raised at one side from the seats 11, thereby raising the posts 9 against the pressures exerted by the weight of the main frame of the truck and the parts carried thereby, which pressures tend to restore the auxiliary frame and the parts carried thereby to the original and normal positions thereof with respect to the main frame.

In Fig. 4, a considerable degree of rectilinear longitudinal movement of the driving axles is permitted without the employment of an auxiliary truck frame, the bearing housings 25 being guided in their movements by wearing pieces 26 carried by the side members 27 of the truck frame and limited in their movements by stops 28 formed integral with the housings. The remainder of the structure is substantially like that shown in the other figures of the drawings.

I claim as my invention:

1. A vehicle truck comprising a frame, an axle, bearings therefor, a foot seated upon each bearing directly above the axle, vertical posts pivotally secured to the respective feet, and springs supported upon said posts and having their ends connected to said frame.

2. A vehicle truck comprising a main frame, an auxiliary frame pivoted thereto, an axle, bearings therefor carried by the auxiliary frame, feet seated upon the bearings, and supporting posts for the main frame pivotally secured to the feet.

3. A vehicle truck comprising a main frame, an auxiliary frame pivoted thereto, an axle, bearings therefor carried by the auxiliary frame, feet seated upon the bearings, supporting posts for the main frame pivotally secured to the feet, the axis of the pivot being disposed transversely of that of the axle, and resilient means interposed between the posts and the main frame.

4. A vehicle truck comprising an axle, bearings therefor having lateral faces inclined to the axis of the axle, a main frame provided with faces corresponding to and adapted to engage the inclined faces on the bearings, an auxiliary frame pivoted to the main frame and carrying the axle bearings, springs having their ends connected to the main frame, posts beneath the middle portions of the springs, and feet pivoted to the lower ends of the posts and resting in seats on the axle bearings directly above the axles.

In testimony whereof, I have hereunto subscribed my name this 31st day of Jany., 1908.

WILLIAM SCHAAKE.

Witnesses:
 HIRAM A. TAYLOR,
 OTTO S. SCHAIRER.